(12) United States Patent
Mathieu-Chef et al.

(10) Patent No.: US 12,485,654 B2
(45) Date of Patent: Dec. 2, 2025

(54) HYBRID ACOUSTIC FLOOR PANEL

(71) Applicant: TARKETT GDL, Lentzweiler (LU)

(72) Inventors: Benjamin Mathieu-Chef, Wiltz (LU); Mathieu Coquelle, Wiltz (LU); Nicolas Boquillon, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 0 days.

(21) Appl. No.: 18/835,460

(22) PCT Filed: Feb. 2, 2023

(86) PCT No.: PCT/EP2023/052496
§ 371 (c)(1),
(2) Date: Aug. 2, 2024

(87) PCT Pub. No.: WO2023/152011
PCT Pub. Date: Aug. 17, 2023

(65) Prior Publication Data
US 2025/0135755 A1  May 1, 2025

(30) Foreign Application Priority Data
Feb. 9, 2022 (LU) ........................................ 501429

(51) Int. Cl.
*B32B 3/10* (2006.01)
*B32B 3/06* (2006.01)
(Continued)

(52) U.S. Cl.
CPC .............. *B32B 27/065* (2013.01); *B32B 3/06* (2013.01); *B32B 5/18* (2013.01); *B32B 5/32* (2013.01); *B32B 7/02* (2013.01); *B32B 27/08* (2013.01); *B32B 27/20* (2013.01); *B32B 27/304* (2013.01); *E04F 15/02038* (2013.01);
(Continued)

(58) Field of Classification Search
None
See application file for complete search history.

(56) References Cited

U.S. PATENT DOCUMENTS 10,794,068 B2  10/2020  Van Vlassenrode et al.
2011/0250434 A1  10/2011  Schauer et al.
(Continued)

FOREIGN PATENT DOCUMENTS

EP  3336278 A1  6/2018
EP  3438374 A1  2/2019
(Continued)

OTHER PUBLICATIONS

SpecialChem https://www.specialchem.com/plastics/guide/hardness-shore-d (Year: 2025).*
(Continued)

*Primary Examiner* — Christopher M Polley
(74) *Attorney, Agent, or Firm* — CANTOR COLBURN LLP

(57) ABSTRACT

A floor panel includes a rigid base slab of thermoplastic material and a flexible decorative top structure fixed on the base slab, the top structure including a wear layer for forming a walking surface of the floor panel, and the top structure including at least one footfall sound reducing foam layer arranged between the wear layer and the base slab.

17 Claims, 2 Drawing Sheets

(51) Int. Cl.
  *B32B 5/18*    (2006.01)
  *B32B 5/32*    (2006.01)
  *B32B 7/02*    (2019.01)
  *B32B 27/06*   (2006.01)
  *B32B 27/08*   (2006.01)
  *B32B 27/20*   (2006.01)
  *B32B 27/30*   (2006.01)
  *E04F 15/02*   (2006.01)
  *E04F 15/10*   (2006.01)
  *E04F 15/20*   (2006.01)

(52) U.S. Cl.
  CPC .......... *E04F 15/107* (2013.01); *E04F 15/206* (2013.01); *B32B 2266/0235* (2013.01); *B32B 2272/00* (2013.01); *B32B 2307/102* (2013.01); *B32B 2307/4026* (2013.01); *B32B 2307/536* (2013.01); *B32B 2307/554* (2013.01); *B32B 2307/72* (2013.01); *B32B 2307/7376* (2023.05); *B32B 2607/00* (2013.01); *E04F 2201/023* (2013.01); *E04F 2201/043* (2013.01)

(56) References Cited

U.S. PATENT DOCUMENTS

2020/0048915 A1   2/2020  Van Vlassenrode et al.
2021/0198902 A1   7/2021  Van Vlassenrode et al.

FOREIGN PATENT DOCUMENTS

| | | | |
|---|---|---|---|
| KR | 102116007 B1 | 5/2020 | |
| WO | 9747834 A1 | 12/1997 | |
| WO | 2013026559 A2 | 2/2013 | |
| WO | WO-2017121499 A1 * | 7/2017 | ............... B32B 7/12 |

OTHER PUBLICATIONS

International Search Report for corresponding application PCT/EP2023/052496 filed Feb. 2, 2023; Mail date Apr. 12, 2023.
Written Opinion for corresponding application PCT/EP2023/052496 filed Feb. 2, 2023; Mail date Apr. 12, 2023.

* cited by examiner

HYBRID ACOUSTIC FLOOR PANEL

TECHNICAL FIELD

The disclosure generally relates to the art of flooring, in particular, to flooring in the form of individual elements, hereinafter referred to as panels, which provides improved acoustic properties. The present disclosure more specifically relates to so-called multilayer flooring based on synthetic polymer material.

BACKGROUND

Floor panels are known in great variety. Laminate and parquet floor panels are well-known examples, but these are not the subject of the present disclosure. Another type of decorative floor panels is the one in which the floor panels are based on synthetic polymer material. Examples include LVT ("luxury vinyl tiles") and WPC ("wood plastic composite") floor panels. These floor panels typically comprise a substrate consisting essentially of thermoplastic polymer material, which, apart from the thermoplastic resin itself, also may comprise plasticizers, additives and/or fillers. The top layer(s) of these floor panels (e.g., the décor layer, the wear layer, etc.) may also be made of thermoplastic material.

WO 2013/026559 A2 aims at providing a floor panel, which exhibits advantageous impact noise properties and can be laid rapidly, simply and without problems. The floor panel takes the form of a multilayer, rectangular laminate with a soft core of plastic, a decor film on the upper side of the core, a transparent finishing layer and a transparent lacquer layer applied on the finishing layer, as well as a back-pull layer on the back of the core, with a lockable tongue and groove connection at least at two mutually opposite edges of the panel.

WO 97/47834 A1 discloses floorcovering, consisting of hard floor panels, which can be coupled with one another by means of cooperating coupling parts. The hard floor panels, at least at the edges of two opposite sides, are provided with coupling parts substantially in the form of a tongue and a groove. The coupling parts are provided with integrated mechanical locking means that prevent the drifting apart of two coupled floor panels into a direction perpendicular to the related edges and parallel to the underside of the coupled floor panels.

US 2020/048915 A1 relates to a floor panel with a substrate and a decoration provided thereon. The substrate includes a foamed layer of thermoplastic material and a reinforcement layer. According to the document, it had been found that a foamed layer had better dimensional stability than a non-foamed layer of the same thermoplastic material and that, with a foamed layer, the reinforcement layer was more effective for restricting dimensional expansions due to temperature variations.

A similar floor panel is disclosed in US 2021/198902 A1. The floor panel comprises a carrier on the basis of thermoplastic synthetic material and a top layer provided on the carrier. The thermoplastic material is free from plasticizers or contains at most 20 phr ("parts per hundred resin", i.e. percentage by weight with respect to the weight of the thermoplastic resin) of plasticizers, the thermoplastic material is foamed or expanded. The carrier is further provided with a reinforcement layer.

U.S. Pat. No. 10,794,068 B2 describes a floor panel, which comprises a substrate having a top layer thereon. The top layer comprises a décor layer, a thermoplastic wear layer, and a lacquer layer on top of the wear layer. The wear layer and the lacquer layer are embossed in order to form a relief. Whereas U.S. Pat. No. 10,794,068 B2 describes the lacquer layer as a separate layer, other documents consider such lacquer layer to be part of the wear layer.

WO 2017/121499 discloses a covering panel, such as a floor panel, comprising at least one substrate and optionally a top layer, the substrate comprising a synthetic material and at least one filler material. The at least one filler is present in an amount of at least 20.0 wt. % based on the weight of the substrate, and comprises at least 50 wt. % talc.

US 2011/250434 relates to a floor decoration kit comprising two elements, on the one hand, a removable surface covering, and, on the other hand, an anchoring sublayer. The composition of the anchoring sublayer is PVC-based and comprises at least 60% by weight of a plasticizer.

KR 10-2116007 relates to a sound insulating composite floor plate capable of reducing generation of interlayer noise. The sound insulating composite floor plate comprises a 5-ply plywood base.

EP 3 438 374 discloses a decorative material purportedly having excellent comfort (walking feel, sitting comfort, etc.) as well as scratch resistance when used as a decorative material for floors. The decorative material comprises, on a base material layer, a first layer, a second layer, and a third layer made of synthetic resin.

EP 3 336 278 relates to a rigid polyvinyl chloride floor tile. The floor tile comprises, from top to bottom, a protective layer, a decorative layer, a support layer and a balance layer. The floor tile has a thermal dimensional shrinkage of 0-0.15% as determined in accordance with European Standard EN434, and a Shore-D hardness of 60°-90°.

Multilayer floor coverings require the development of the individual layers under the constraint that the multilayer assembly as a whole satisfies the technical requirements, in particular the applicable industrial standards. One aspect of this development work relates to selecting mutually compatible layers and finding solutions for making compatible a priori incompatible layers while preserving the desired effects of the different layers.

BRIEF SUMMARY

The disclosure provides a floor panel having acoustic properties. According to embodiments, the acoustic properties may be adapted to be usable for desired purposes, like strengthening or attenuation of sound. An object of aspects of the disclosure may comprise the reduction of in-room impact noise.

Floor coverings comprising synthetic-polymer-based layers may comprise acoustic properties. A floor panel may comprise an exposed surface (walking surface) provided by a decorative top structure and a baseplate (or base slab) that carries the decorative top structure. According to at least one or some embodiments, properties, like resistance to moisture, stiffness, anisotropic speed of sound or vibration dampening, may be achieved.

Floor panels according to embodiments of the disclosure may be used as acoustic material, in particular as sound barriers.

According to a first aspect of the disclosure, a floor panel comprises a rigid base slab of thermoplastic material and a flexible decorative top structure fixed on the base slab. The top structure includes a wear layer for forming a walking surface of the floor panel. The top structure includes at least one footfall sound reducing foam layer arranged between the wear layer and the base slab.

The base slab and the decorative top structure are herein qualified as "rigid" and "flexible", respectively, to transport the meaning that the base slab is more rigid than the decorative top structure and that the decorative top structure is, conversely, more flexible than the base slab.

The qualifier "decorative", as used herein, is intended to imply that the item thereby qualified, such as the surface covering, remains visible in normal use (as an item of finishing work). The use of the term, should not, however, be taken to imply any particular aesthetic appearance. The expression "décor layer" designates a layer with a decorative motif. Examples of décor layers include print layers, in particular, rotogravure-printed layers and digitally printed layers.

The term "thermoplastic" material encompasses plastic polymer material that becomes pliable or moldable at a certain elevated temperature and solidifies upon cooling. Thermoplastic material may comprise thermoplastic polymers and, optionally, one or more plasticizers, (mineral or organic) fillers, and further additives (e.g., impact modifiers) or processing aids. Thermoplastic polymers include, for example: polyacrylic acid, polyacrylate, polyamide, polyester, polylactic acid (PLA), polycarbonate, polyether sulfone (PES), polyether ether ketone (PEEK), polyetherimide (PEI), polyethylene, polypropylene (PP), polystyrene, polyvinyl chloride (PVC), polyvinylidene fluoride (PVDF), acrylonitrile butadiene styrene (ABS), etc.

Preferred variants of the base slab include one or more thermoplastic layers consisting of agglomerated (fused) thermoplastic granules and/or of one or more (co-)extruded thermoplastic layers.

Preferably, the rigid base slab comprises no foamed layer, i.e., consists of one or more unfoamed thermoplastic layers. According to an embodiment, the rigid base slab may be comprised of one or more thermoplastic PVC layers, none of the one or more thermoplastic PVC layers of the rigid base slab being a foamed layer.

The rigid base slab preferably has a thickness in the range from 2.5 mm to 7 mm. More preferably, the thickness of the rigid base slab is in the range from 3 mm to 5.5 mm and still more preferably, the thickness of the rigid base slab is in the range from 3.5 mm to 5 mm.

The top structure preferably has a thickness in the range from 1.2 mm to 4 mm.

The rigid base slab may have a thickness greater than the thickness of the top structure.

The top structure is preferably bonded to the base slab by hotmelt adhesive (e.g., an adhesive polyamide film). Alternatives to hotmelt, although less preferred, may be used as well, e.g. double-sided adhesive film.

According to preferred embodiments, the flexible decorative top structure comprises a décor layer and a reinforcement veil or grid.

The footfall sound reducing foam layer preferably has a thickness of at least 0.5 mm (when not compressed, at an ambient temperature of 20° C. and atmospheric pressure of 1 bar), more preferably of at least 0.7 mm, still more preferably of at least 1 mm, and yet more preferably of at least 1.2 mm. The footfall sound reducing foam layer is preferably configured, e.g., in terms of density, thickness, etc., such that the floor panel achieves a sound attenuation in transmission of 20 dB or more, more preferably, of 22 dB or more, and still more preferably, of 24 dB or more, in accordance with standards EN ISO 10140-3 (2021) and/or EN ISO 717-2 (2020).

According to preferred embodiments, the rigid base slab has a Shore D hardness of at least 65, of at least 70, or of at least 75. On the other hand, the flexible decorative top structure preferably has a Shore D hardness of 50 or less, more preferably of 40 or less, and still more preferably of 30 or less. Embodiments, wherein the rigid base slab and the flexible decorative top structure have Shore D hardness as in the following table are regarded as particularly preferred:

TABLE 1

Preferred Shore D hardness combinations

| base slab | top structure |
|---|---|
| ≥65 | ≤50 |
| ≥65 | ≤40 |
| ≥65 | ≤30 |
| ≥70 | ≤50 |
| ≥70 | ≤40 |
| ≥70 | ≤30 |
| ≥75 | ≤50 |
| ≥75 | ≤40 |
| ≥75 | ≤30 |

The floor panel preferably comprises no other foam layer than the at least one footfall sound reducing foam layer arranged between the wear layer and the base slab. It has been found, somewhat surprisingly, that further foamed layers do not improve sound attenuation in transmission and may even worsen it.

According to preferred embodiments, the floor panel is of polygonal shape. For instance, the shape of the floor panel may be that of a star-shaped polygon, i.e., a polygon that delimits an area containing a point from which the entire polygon boundary is visible ("visible" being in this case understood in the geometrical sense, meaning that from every point of the polygon boundary one can draw a straight segment to the point such that the segment does not intersect the boundary at another point). More preferably, the shape of the floor panel may be that of a convex polygon. Most preferred shapes are rectangular (e.g., square) and regular hexagonal.

According to preferred embodiments, the floor panel comprises at least two edges with connection profiles (e.g., tongue and groove connectors, or male/female connectors) formed within the rigid base slab.

Preferably, the thermoplastic material of the rigid base slab is rigid thermoplastic, such as, e.g., rigid PVC. The expression "rigid PVC" herein designates PVC material that is free from plasticizers or contains a content of plasticizers of 12 phr or less. Preferably, the content of plasticizers in rigid PVC is between 0 and 10 phr. More preferably, the content of plasticizers in rigid PVC is at most 5 phr. Still more preferably, the content of plasticizers in rigid PVC is between 0 and 2 phr. In some preferred embodiments, the content of plasticizers in rigid PVC is 0, i.e., the PCV material is free of plasticizers.

According to preferred embodiments, the thermoplastic material of the rigid base slab comprises filler, e.g., limestone, calcium carbonate, chalk, talc, kaolin magnesium carbonate, wood fibers, wood flakes, cellulose fibers, wood-based cellulose fibers (e.g. hardwood cellulose fibers or softwood cellulose fibers), non-wood cellulose fibers (obtained from plants such as, e.g., flax, hemp, bamboo, etc.) Filler(s) may also be present in the footfall sound reducing foam layer.

Advantageously, the rigid base slab may comprise at least two layers of thermoplastic materials having different composition. The at least two layers of thermoplastic materials could be co-extruded.

According to a preferred embodiment, the rigid base slab has a so-called "ABA" structure, i.e. comprises an inner layer of thermoplastic material (layer "B") and two sandwiching layers of thermoplastic material (layers "A"), the two sandwiching layers sandwiching the inner layer, and the thermoplastic material of the inner layer being of different composition than the thermoplastic material of the sandwiching layers. For example, the thermoplastic material of the inner layer could have different filler content than the thermoplastic material of the sandwiching layers. Alternatives to the ABA structure include the ABBA structure, the AB structure, the ABC structure (with a third different composition), etc.

According to an exemplary embodiment of the disclosure, the floor panel comprises:
- the rigid base slab of thermoplastic material, the base slab comprising one or more thermoplastic PVC layers, none of the one or more thermoplastic PVC layers of the rigid base slab being a foamed layer;
- and the flexible decorative top structure bonded to the base slab by hotmelt adhesive, the top structure including the wear layer for forming a walking surface of the floor panel and the at least one footfall sound reducing foam layer arranged between the wear layer and the base slab;

wherein the rigid base slab has its thickness in the range from 2.5 mm to 7 mm, wherein the top structure has its thickness in the range from 2 mm to 4 mm, wherein the rigid base slab has its thickness greater than the thickness of the top structure, wherein the footfall sound reducing foam layer has a thickness of at least 1 mm, preferably of at least 1.2 mm, and wherein the floor panel comprises no other foam layer than the at least one footfall sound reducing foam layer arranged between the wear layer and the base slab.

According to preferred variants of this exemplary embodiment, (a) the thermoplastic material of the rigid base slab is rigid PVC; (b) the rigid base slab comprises at least two layers of thermoplastic materials having different composition; and/or (c) the rigid base slab comprises an inner layer of thermoplastic material and two sandwiching layers of thermoplastic material, the two sandwiching layers sandwiching the inner layer, and wherein the thermoplastic material of the inner layer has a different composition (e.g., filler content) than the thermoplastic material of the sandwiching layers; and/or (d) the flexible decorative top structure comprises a décor layer and a reinforcement veil or grid; and/or (e) the rigid base slab has a Shore D hardness of at least 65, preferably of at least 70, more preferably of at least 75; and/or (f) the flexible decorative top structure has a Shore D hardness of 50 or less, preferably of 40 or less, more preferably of 30 or less; and/or (g) the floor panel has a combination of Shore D hardness values according to Table 1 above; and/or (h) the floor panel is of polygonal shape; and/or (i) the floor panel comprises at least two edges with connection profiles formed within the rigid base slab.

In the present document, the verb "to comprise" and the expression "to be comprised of" are used as open transitional phrases meaning "to include" or "to consist at least of". Unless otherwise implied by context, the use of singular word form is intended to encompass the plural, except when the cardinal number "one" is used: "one" herein means "exactly one". Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context). When this description refers to "an embodiment", "one embodiment", "embodiments", etc., this means that the features of those embodiments can be used in the combination explicitly presented but also that the features can be combined across embodiments without departing from the disclosure, unless it follows from context that features cannot be combined.

BRIEF DESCRIPTION OF THE DRAWINGS

By way of example, preferred, non-limiting embodiments of the disclosure will now be described in detail with reference to the accompanying drawings, in which.

It should be noted that the drawings are not to scale. In particular, the thicknesses of the individual layers are not necessarily shown in the right proportions.

DETAILED DESCRIPTION

Figure 1:
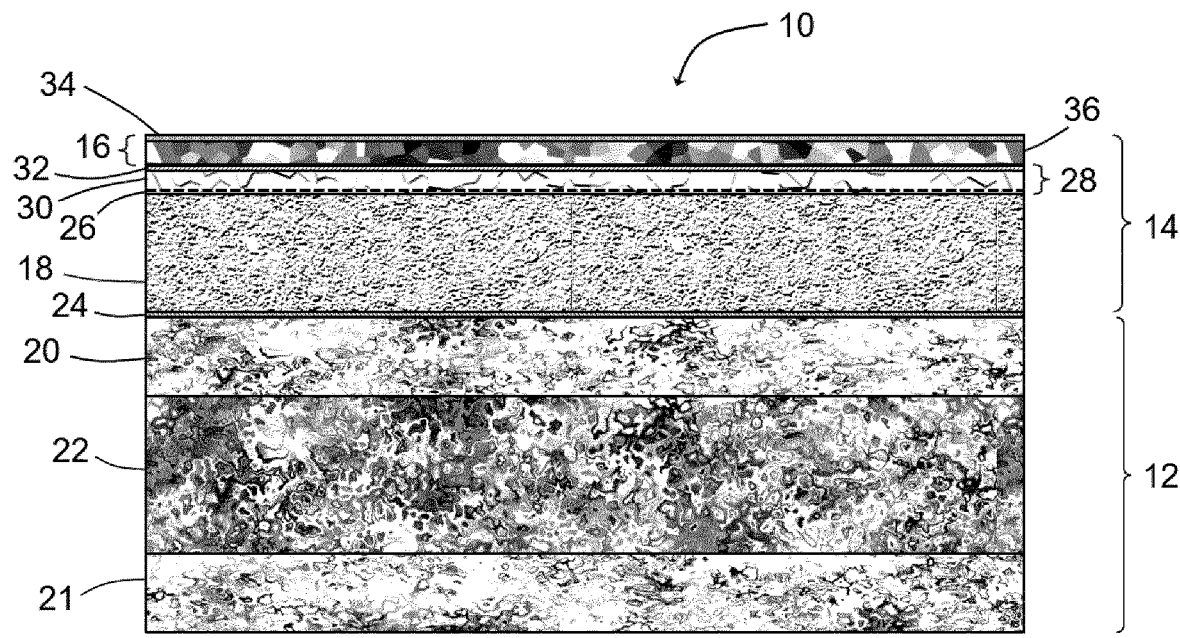
FIG. 1: is a cross-sectional schematic view of an exemplary embodiment of a floor panel.

A floor panel 10 according to an embodiment of the disclosure is shown in FIG. 1. The floor panel 10 has acoustic properties that may be adapted to be usable for desired purposes, like strengthening or attenuation of sound. Floor panel 10 comprises an exposed surface (walking surface) provided by a decorative top structure 14 and a base slab 12 that carries the decorative top structure 14. Properties desirable for flooring, like resistance to moisture, stiffness, anisotropic speed of sound and vibration dampening, are preferably achieved. As used herein, "anisotropic speed of sound" means that the speed of sound is arranged to be different in the in-plane and the perpendicular directions of the floor panel. Likewise, anisotropic vibration dampening means that the attenuation of vibrations (e.g., impact sound) is arranged to be different in the in-plane and the perpendicular directions of the floor panel.

The floor panel 10 according to the embodiment illustrated in FIG. 1 comprises a rigid base slab 12 of thermoplastic material and a flexible decorative top structure 14 fixed on the base slab 12.

The top structure includes a wear layer 16 that forms a walking surface of the floor panel 10. The top structure 14 includes a foam layer 18 arranged between the wear layer and the base slab. The foam layer 18 reduces footfall (impact) sound. Thanks to the foam layer 18, the top structure as a whole may be configured to yield to loads applied to the top surface, like impacts, footfalls, etc., so as to act as a shock-absorber.

The top structure may have a thickness in the range from 2 mm to 4 mm. The base slab may have a thickness greater than the thickness of the top structure.

In the embodiment of the floor panel shown in FIG. 1, the top structure 14 comprises a décor layer 28 and a reinforcement veil 26 (illustrated as a dashed line). In the illustrated example, the décor layer 28 comprises a printing substrate 30 carrying an ink layer 32 applied on the printing substrate by printing, e.g., digital printing. Alternatively, the décor layer 28 could be printed on the bottom side of the wear layer 16. It should also be noted that the décor layer 28 need not include a décor that is printed. For instance, the décor layer could comprise a decorative thermoplastic layer, e.g., obtained by fusing colored thermoplastic granules and/or including colored or metallic particles, or the like.

According to the illustrated embodiment, the wear layer 16 includes two transparent or at least translucent layers 34, 36. Alternatively, a single-layer wear layer could be used. In the illustrated case, the wear layer 16 includes a transparent thermoplastic layer 36 (e.g., a transparent PVC layer), which carries a crosslinked polymer layer 34, e.g., a thermoset polymer, a radiation-cured polymer (UV-cured or cured by electron beam). The crosslinked polymer layer 34 preferably comprises a polyurethane (PU) top layer.

The footfall sound reducing foam layer 18 may have a thickness of at least 1 mm (at an ambient temperature of 20° C. and atmospheric pressure of 1 bar, when not compressed by an external load such as, e.g., a person or a piece of furniture), more preferably of at least 1.2 mm. The footfall sound reducing foam layer 18 may achieve a sound attenuation in transmission of 20 dB or more, more preferably, of 22 dB or more, and still more preferably, of 24 dB or more, according to standards EN ISO 10140-3 (2021) and EN ISO 717-2 (2020).

The flexible decorative top structure 14 may be bonded to the base slab 12 with an adhesive 24, e.g., an adhesive film, preferably a hotmelt adhesive film. An example of a hotmelt adhesive film would be an adhesive polyamide film. Alternatives to hotmelt, such as, e.g., thermoset adhesives, could be used as well. Examples of thermoset adhesives include epoxy thermoset films.

The rigid base slab 12 may comprise a single layer of agglomerated thermoplastic granules or of extruded thermoplastic material. FIG. 1 shows a base slab 12 that comprises multiple layers 20, 21, 22 of thermoplastic material. These layers 20, 21, 22 are preferably (co-)extruded or consist of agglomerated (fused) thermoplastic granules. The thermoplastic layers of the rigid base slab 12 may be PVC-based. While PVC may be preferred in numerous applications, other thermoplastic polymers can be used as well.

The rigid base slab 12 of FIG. 1 has the above-mentioned "ABA" structure, with two layers 20, 21 of a first composition that sandwich an inner layer 22 of a second composition. The compositions of the inner and sandwiching layers could differ in various aspects, e.g., type of filler material, filler content, plasticizer species, plasticizer content, additives, etc. But is also possible that the compositions of the inner and sandwiching layers are identical except for one parameter, e.g., the filler content. For example, the thermoplastic material of the inner layer could have higher or lower filler content than the thermoplastic material of the sandwiching layers.

As shown in FIG. 1, the rigid base slab according to the preferred embodiments comprises no foamed layer. The rigid base slab preferably has a thickness in the range from 2.5 mm to 7 mm, the thickness range from 3 mm to 5.5 mm being more preferred and the thickness range from 3.5 mm to 5 mm being yet more preferred.

The thermoplastic material of the rigid base slab 12 may be rigid thermoplastic, preferably rigid PVC. The PVC material of the different layers 20, 21, 22 of the base slab 12 in this case has a plasticizer content of 12 phr or less, preferably 10 phr or less, more preferably 5 phr or less, still more preferably 2 phr or less and most preferably, the layers 20, 21, 22 of the base slab 12 are free of plasticizer. The different layers 20, 21, 22 of the base slab 12 may contain one or more impact modifiers, e.g., from 3 to 15 phr, preferably from 5 to 10 phr, thereof. The thermoplastic material(s) of the rigid base slab 12 may further comprise filler(s) and other additives.

The rigid base slab and the flexible decorative top structure may have Shore D hardness values as indicated in Table 1 above.

The floor panel 10 shown in FIG. 1 comprises no other foam layer than the footfall sound reducing foam layer 18 arranged between the wear layer 16 and the base slab 12. A comparative test has shown that further foamed layers do not improve sound attenuation in transmission and may even worsen it.

The shape of the floor panel 10 is preferable that of a convex polygon. Most preferred shapes are rectangular (e.g., square) and regular hexagonal.

Figure 2:
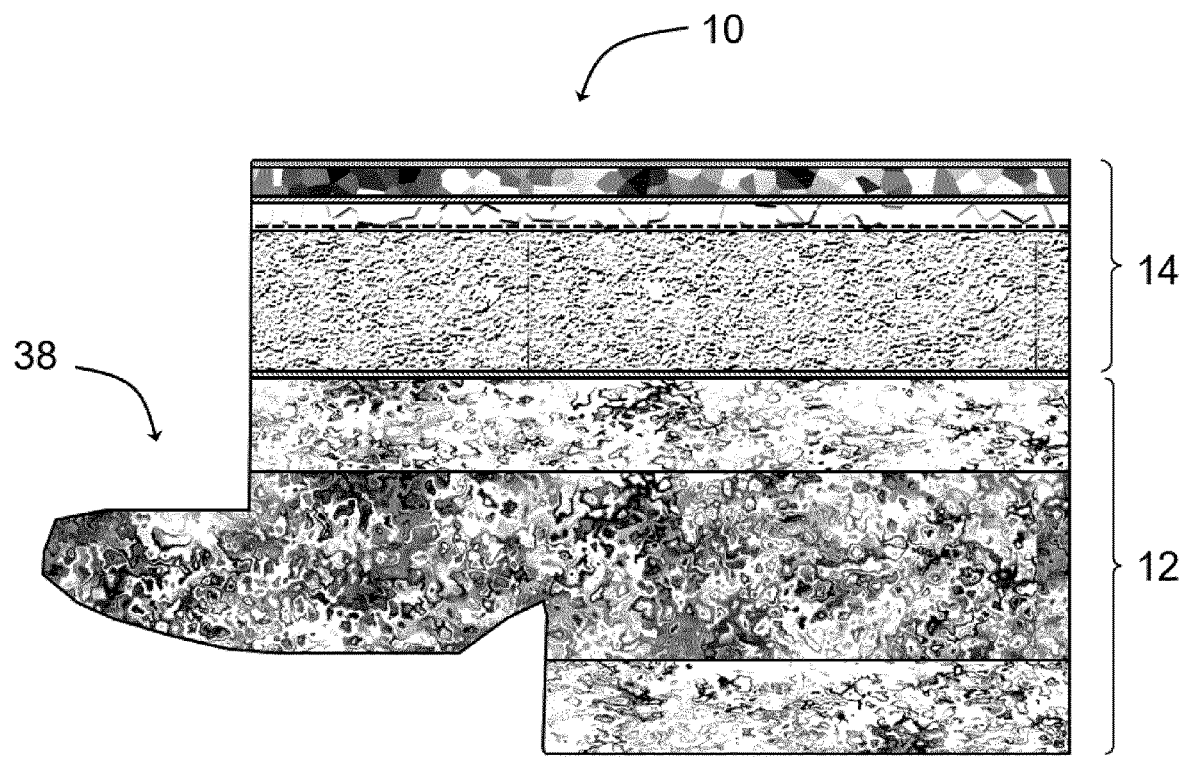
FIG. 2: is a cross-sectional schematic view of a first connector for the floor panel of FIG. 1.
Figure 3:
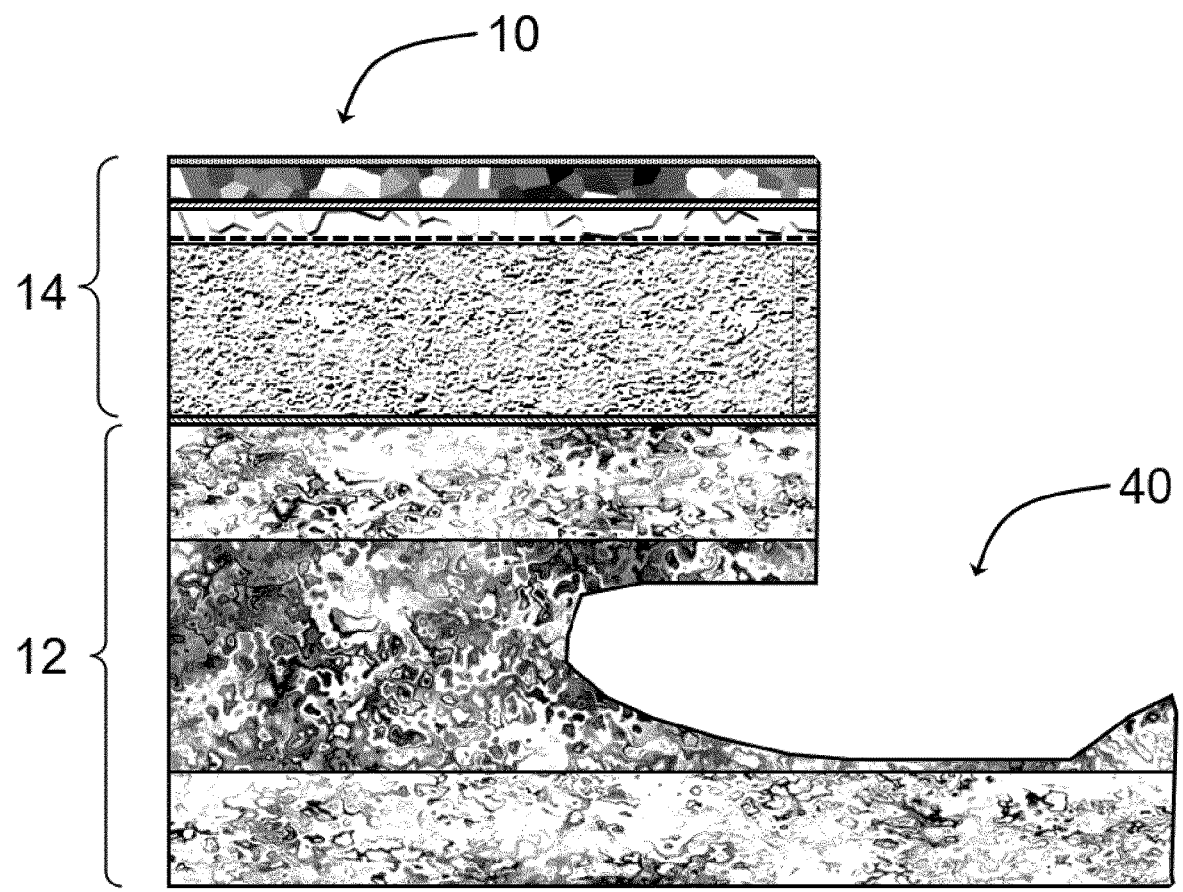
FIG. 3: is a cross-sectional schematic view of a second connector for the floor panel of FIG. 1, the second connector being shaped complementarily to the first connector of FIG. 2.

As shown in FIGS. 2 and 3, the floor panel may comprise at least two edges with connection profiles 38, 40 (e.g., tongue and groove connectors, or male/female connectors) formed within the rigid base slab (e.g., by machining or moulding).

EXAMPLE

A floor panel as shown in FIG. 1 was obtained by bonding a flexible top structure to a base slab using a hotmelt copolyamide.

The compositions of the main layers of the flexible top structure were chosen as indicated in Table 2.

TABLE 2

| | Wear layer | Printing substrate | Footfall sound reducing foam |
|---|---|---|---|
| Raw material type | phr | phr | phr |
| PVC | 100 | 100 | 100.00 |
| Filler | | 162 | 119.35 |
| Plasticizer | 36 | 77.15 | 64.26 |
| Blowing agent | | | 2.97 |
| Kicker | | | 1.55 |
| Stabilizer | 3 | | |
| Air release agent | 1 | | |
| Pigment | | 7.7 | |
| TOTAL | 140.00 | 346.85 | 288.13 |

The footfall sound reducing foam layer had a thickness of 1.9 mm and a density of 300 kg/m3. The indentation measured according to EN ISO 24343-1 was 0.1 mm.

The thickness of the wear layer was 0.34 mm and the thickness of the printing substrate was 0.74 mm.

The Shore D hardness of the flexible top structure as a whole was 20, (average of measurements made with a lab durometer on 7 samples (minimum: 18.3, maximum: 21.3)).

The base slab was made of an inner layer (composition B) sandwiched by two outer layers (composition A). Compositions A and B are detailed in Table 3.

TABLE 3

| | Composition A | Composition B |
|---|---|---|
| Raw material type | phr | phr |
| PVC | 100 | 100 |
| Recycling content (recycled PVC) | 125 | 85 |
| Stabilizer | 8 | 8 |
| Impact modifier | 6 | 6 |
| processing aid | 5 | 5 |
| filler | 250 | 300 |
| wax | 1 | 1 |

TABLE 3-continued

|  | Composition A | Composition B |
|---|---|---|
| Filler compatiblizer | 5 | 0 |
| Stearic acid | 0.7 | 1.2 |
| Pigment | 0.15 | 0 |
| TOTAL | 500.85 | 506.20 |

The thickness of the base slab amounted to 4.85 mm, the outer layers had thicknesses of 1.20 mm and 1.24 mm, respectively, and the inner layer had a thickness of 2.41 mm. The Shore D hardness of the base slab was 78 (average of measurements made with a lab durometer on 7 samples (minimum: 77.6, maximum: 78.5)).

The floor panel according to the example provided an impact sound attenuation of 24 dB (when applied directly on the floor). In a comparative test, an additional foam layer (made of irradiation cross-linked polyethylene, IXPE) was attached to the bottom side of the base slab; in this case, the impact sound attenuation was only 22 dB. This was still better than the impact sound attenuation of 18 dB achieved with a comparative floor panel having no footfall sound reducing foam layer between the wear layer and the base but the same IXPE foam attached to the base bottom.

Floor panels according to the disclosure also showed improved wear resistance, assessed by means of the castor chair test. According to this test procedure, a floor covering, including plural floor panels connected to one another, is submitted to the action of three castors for a prescribed number of cycles. With the floor panels according to the disclosure only 17% of the connection profiles were found to be broken after 25000 cycles, whereas 58% of the connection profiles of comparative floor panels turned out to be broken after 15000 cycles.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the disclosure, which is to be given the full breadth of the appended claims and any and all equivalents thereof.

The invention claimed is:

1. A floor panel, comprising
a rigid base slab of thermoplastic material,
a flexible decorative top structure fixed on the base slab, the top structure including a wear layer for forming a walking surface of the floor panel;
wherein
the top structure includes at least one footfall sound reducing foam layer arranged between the wear layer and the base slab;
wherein the rigid base slab comprises at least two layers of thermoplastic materials having different composition;
and wherein the rigid base slab comprises an inner layer of thermoplastic material and two sandwiching layers of thermoplastic material, the two sandwiching layers sandwiching the inner layer, and wherein the thermoplastic material of the inner layer has a different filler content than the thermoplastic material of the sandwiching layers.

2. The floor panel as claimed in claim 1, wherein the rigid base slab is comprised of one or more thermoplastic PVC layers, none of the one or more thermoplastic PVC layers of the rigid base slab being a foamed layer.

3. The floor panel as claimed in claim 1, wherein the rigid base slab has a thickness in the range from 2.5 mm to 7 mm.

4. The floor panel as claimed in claim 1, wherein the top structure has a thickness in the range from 1.2 mm to 4 mm and wherein the rigid base slab has a thickness greater than the thickness of the top structure.

5. The floor panel as claimed in claim 1, wherein the top structure is bonded to the base slab by hotmelt adhesive.

6. The floor panel as claimed in claim 1, wherein the flexible decorative top structure comprises a décor layer and a reinforcement veil or grid.

7. The floor panel as claimed in claim 1, wherein the footfall sound reducing foam layer has a thickness of at least 0.5 mm.

8. The floor panel as claimed in claim 1, wherein the rigid base slab has a Shore D hardness of at least 65.

9. The floor panel as claimed in claim 1, wherein the flexible decorative top structure has a Shore D hardness of 50 or less.

10. The floor panel as claimed in claim 1, comprising no other foam layer than the at least one footfall sound reducing foam layer arranged between the wear layer and the base slab.

11. The floor panel as claimed in claim 1, the floor panel being of polygonal shape and comprising at least two edges with connection profiles formed within the rigid base slab.

12. The floor panel as claimed in claim 1, wherein the thermoplastic material of the rigid base slab is rigid PVC.

13. The floor panel as claimed in claim 1, wherein the footfall sound reducing foam layer has a thickness of at least 0.5 mm, when not compressed, at an ambient temperature of 20° C. and atmospheric pressure of 1 bar.

14. The floor panel as claimed in claim 1, wherein the footfall sound reducing foam layer is configured, in terms of density and thickness, such that the floor panel achieves a sound attenuation in transmission of 20 dB or more, in accordance with standards EN ISO 10140-3 (2021) and/or EN ISO 717-2 (2020).

15. The floor panel as claimed in claim 1,
wherein the rigid base slab is comprised of one or more thermoplastic PVC layers, none of the one or more thermoplastic PVC layers of the rigid base slab being a foamed layer,
wherein the rigid base slab has a thickness in the range from 2.5 mm to 7 mm,
wherein the top structure has a thickness in the range from 1.2 mm to 4 mm,
wherein the rigid base slab has a thickness greater than the thickness of the top structure,
wherein the top structure is bonded to the base slab by hotmelt adhesive,
wherein the footfall sound reducing foam layer has a thickness of at least 0.5 mm,
and wherein the floor panel comprises no other foam layer than the at least one footfall sound reducing foam layer arranged between the wear layer and the base slab.

16. The floor panel as claimed in claim 1,
wherein the rigid base slab is comprised of one or more thermoplastic PVC layers, none of the one or more thermoplastic PVC layers of the rigid base slab being a foamed layer,
wherein the floor panel comprises no other foam layer than the at least one footfall sound reducing foam layer arranged between the wear layer and the base slab, and
wherein the thermoplastic material of the rigid base slab is rigid PVC.

17. The floor panel as claimed in claim 1,
wherein the rigid base slab is comprised of one or more thermoplastic PVC layers, none of the one or more thermoplastic PVC layers of the rigid base slab being a foamed layer,
wherein the rigid base slab has a thickness in the range from 2.5 mm to 7 mm,
wherein the top structure has a thickness in the range from 1.2 mm to 4 mm,
wherein the rigid base slab has a thickness greater than the thickness of the top structure,
wherein the top structure is bonded to the base slab by hotmelt adhesive,
wherein the flexible decorative top structure comprises a décor layer and a reinforcement veil or grid,
wherein the footfall sound reducing foam layer has a thickness of at least 0.5 mm,
wherein the rigid base slab has a Shore D hardness of at least 65,
wherein the flexible decorative top structure has a Shore D hardness of 50 or less,
wherein the floor panel comprises no other foam layer than the at least one footfall sound reducing foam layer arranged between the wear layer and the base slab,
wherein the floor panel is of polygonal shape and comprises at least two edges with connection profiles formed within the rigid base slab,
and wherein the thermoplastic material of the rigid base slab is rigid PVC.

\* \* \* \* \*